March 11, 1930. H. J. HOENES 1,750,470
MOLD CLEANING MACHINE
Filed Feb. 21, 1928 3 Sheets-Sheet 1

Inventor
Herman J. Hoenes
Attorney

March 11, 1930.   H. J. HOENES   1,750,470
MOLD CLEANING MACHINE
Filed Feb. 21, 1928   3 Sheets-Sheet 3

Inventor
Herman J. Hoenes
By
Attorney

Patented Mar. 11, 1930

1,750,470

UNITED STATES PATENT OFFICE

HERMAN J. HOENES, OF AKRON, OHIO, ASSIGNOR TO THE GOODYEAR TIRE & RUBBER COMPANY, OF AKRON, OHIO, A CORPORATION OF OHIO

MOLD-CLEANING MACHINE

Application filed February 21, 1928. Serial No. 255,936.

This invention relates to machinery for cleaning surfaces of relatively hard articles, and it has particular relation to a machine for cleaning the molding plates employed in the manufacture of rubberized belting.

The object of the invention is to provide a machine for cleaning molding plates, or the like, which practically obviates the tedious manual labor heretofore required, and in addition, saves much valuable time and insures a more successful cleaning operation.

At one stage in the manufacture of rubber belting, molding plates are employed to give to the finished article a desired size and configuration. The molding plates ordinarily are of steel and have either plain or serrated surfaces. During the course of their use, the plates become coated with a hard substance which usually includes in varying quantities, hard rubber, soapstone, rubber pigments, etc., and unless this substance is removed, the plate becomes unsuitable for further use. It has been the usual practice to remove this substance by a manual operation of brushing and washing, employing certain cleaning materials to facilitate the operation. This operation consumed a great amount of time and in addition required much tedious labor.

A machine designed according to this invention may be moved over the molding plate in adjustable relation thereto. The machine, principally, consists of a rotatable cleaning element which, while in operation, may be moved longitudinally, laterally and vertically relative to the molding plate. Practically all of the manual labor heretofore required, is dispensed with, and the cleaning of the plate is greatly facilitated.

For a better understanding of the invention, reference may now be had to the accompanying drawings, forming a part of this specification, in which:

Fig. 5 is a cross-sectional view taken substantially along the line V—V of Fig. 3.

Figure 1:
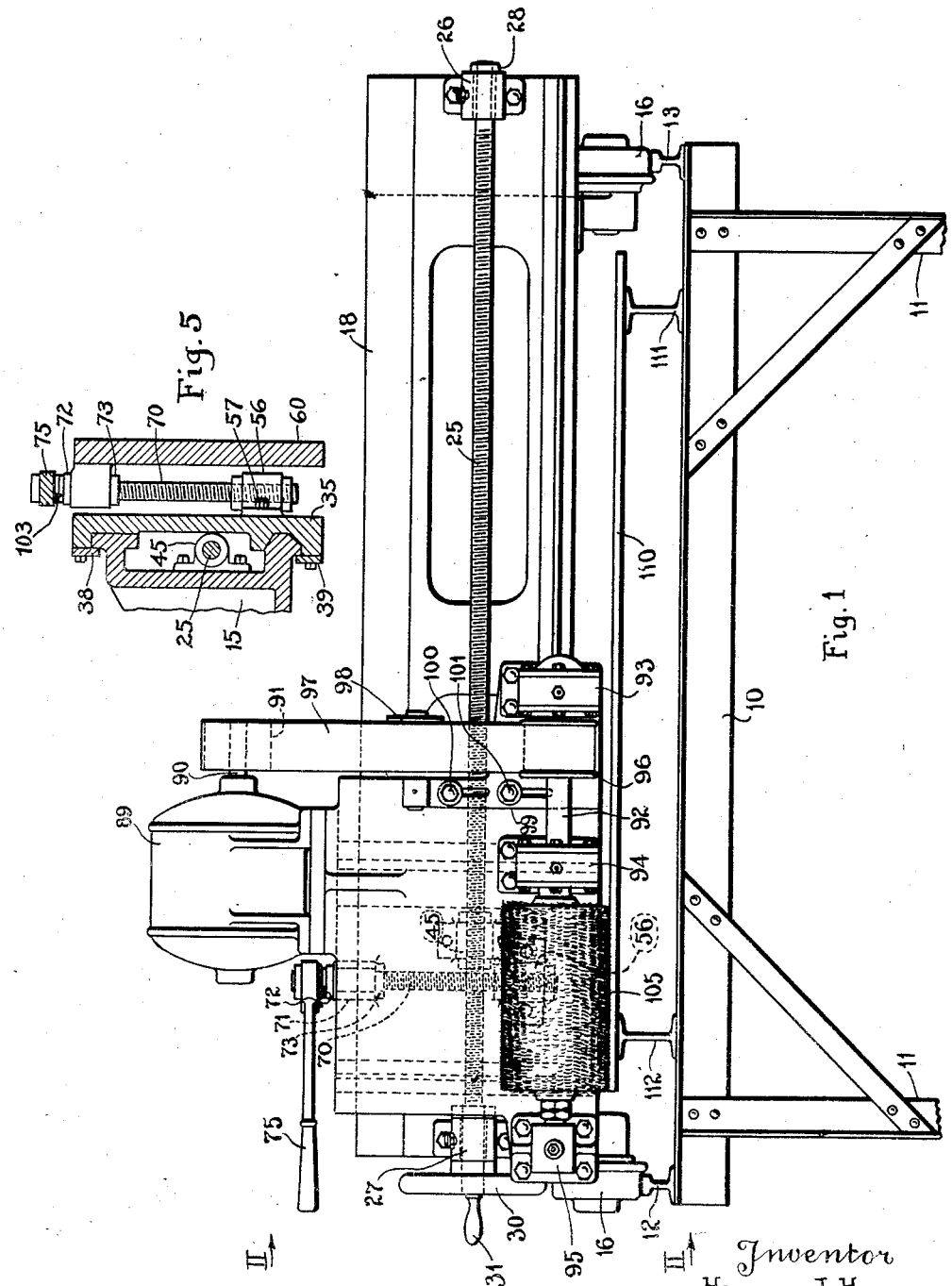
Fig. 1 is a front elevational view of a machine constructed according to the invention.
Figure 2:
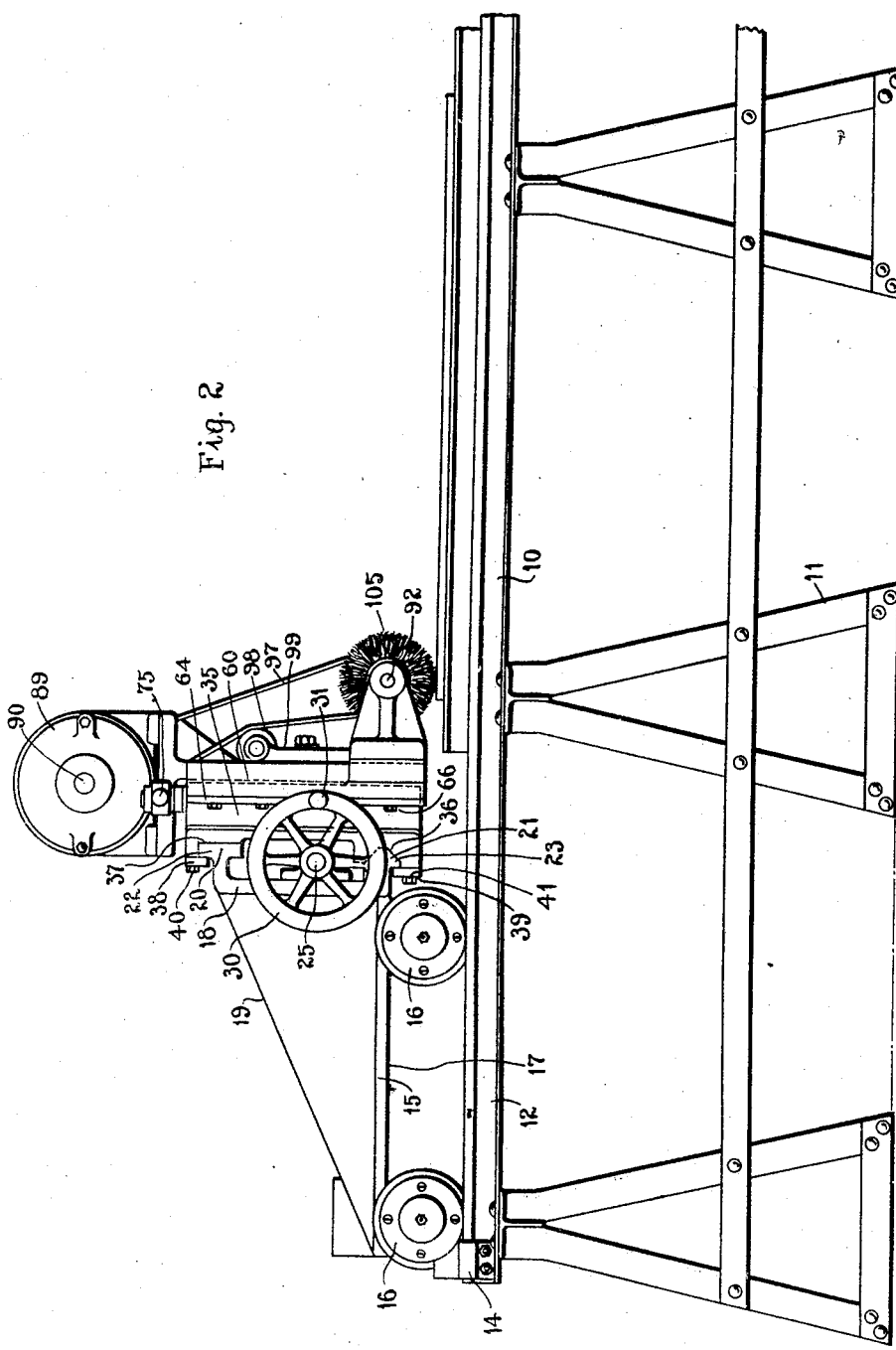
Fig. 2 is a side elevational view of the machine looking in the direction indicated by the arrows II—II in Fig. 1.

Referring to Figs. 1 and 2, a frame work 10, supported by a plurality of legs 11 is provided with rails 12 and 13 mounted thereupon, adjacent each side thereof, and extending the length of the frame work. At least one of the rails has a stop 14 on one end. A main frame 15 is mounted movably upon the rails 12 and 13 by means of a plurality of flanged wheels 16, and is prevented from rolling beyond the ends of the rails 12 and 13 by means of the stop 14 heretofore referred to. The frame 15 comprises a horizontal portion 17 and a forward, vertically extending portion 18, and is reinforced by webs 19 which extend between the portions 17 and 18.

The upright portion 18 is provided on its forward surface with vertically spaced slides 20 and 21, which extend laterally substantially the width of the frame 15. On its upper side the slide 20 has a longitudinally extending flange 22, whereas the slide 21 has a similar but downwardly extending flange 23. A screw 25 extends centrally of and parallel to the slides 20 and 21 and is mounted rotatably in bearings 26 and 27 on the upright portion 18. The screw 25 is prevented from longitudinal movement relative to the frame 15 by means of a collar 28 and a hand wheel 30 which are secured to the screw in abutting relation to the bearings 26 and 28, respectively. The hand wheel 30 has a handle 31 to facilitate turning of the wheel and screw.

A vertically disposed frame 35, mounted slidably upon the slides 20 and 21 of the frame 15, has a lower guide 36 which coacts with the slide 20, and an upper guide 37 which coacts with the slide 21. The frame 35 is maintained upon the slides 20 and 21, by bars 38 and 39 which engage the flanges 22 and 23 respectively, and are secured to the frame 35 by bolts 40 and 41. An internally threaded member 45 is secured centrally to the frame 35, and receives the screw 25, whereby when the screw is rotated by means of the hand wheel 30, lateral sliding motion will be imparted to the frame 35, relative to the frame 15.

The frame 35 on its forward face is formed with vertical slides 50 and 51 which are similar in construction to the slides 20 and 21, respectively. The slides 50 and 51 are provided respectively with flanges 52 and 53, similar to the flanges 22 and 23 formed on the slides 20 and 21. The frame 35 also is provided on its front face and intermediately of the slides 50 and 51 with an internally threaded block 56, secured thereto by bolts 57.

A third frame 60 vertically slidable relative to the frame 35 is formed with guides 61 and 62 which coact with the slides 50 and 51, respectively. Bars 63 and 64 which overlap the ledges 52 and 53, respectively, are secured to the guides 61 and 62, by bolts 65 and 66. These bars engage the flanges 52 and 53 and thereby maintain the guides 61 and 62 in coacting relation with the slides 50 and 51. The frame 60 is movable vertically by means of a screw 70 which is mounted rotatably upon the frame and is threaded through the threaded element 56 on the frame 35. The screw is mounted rotatably in a journal 71 on the frame 60 and has collars 72 and 73 fixed thereto on each side of the journal, whereby the screw is rotatable in the journal but is not slidable therein. The upper end of the screw 70 is provided with a handle 75, to facilitate the rotation thereof.

Figures 3, 4:
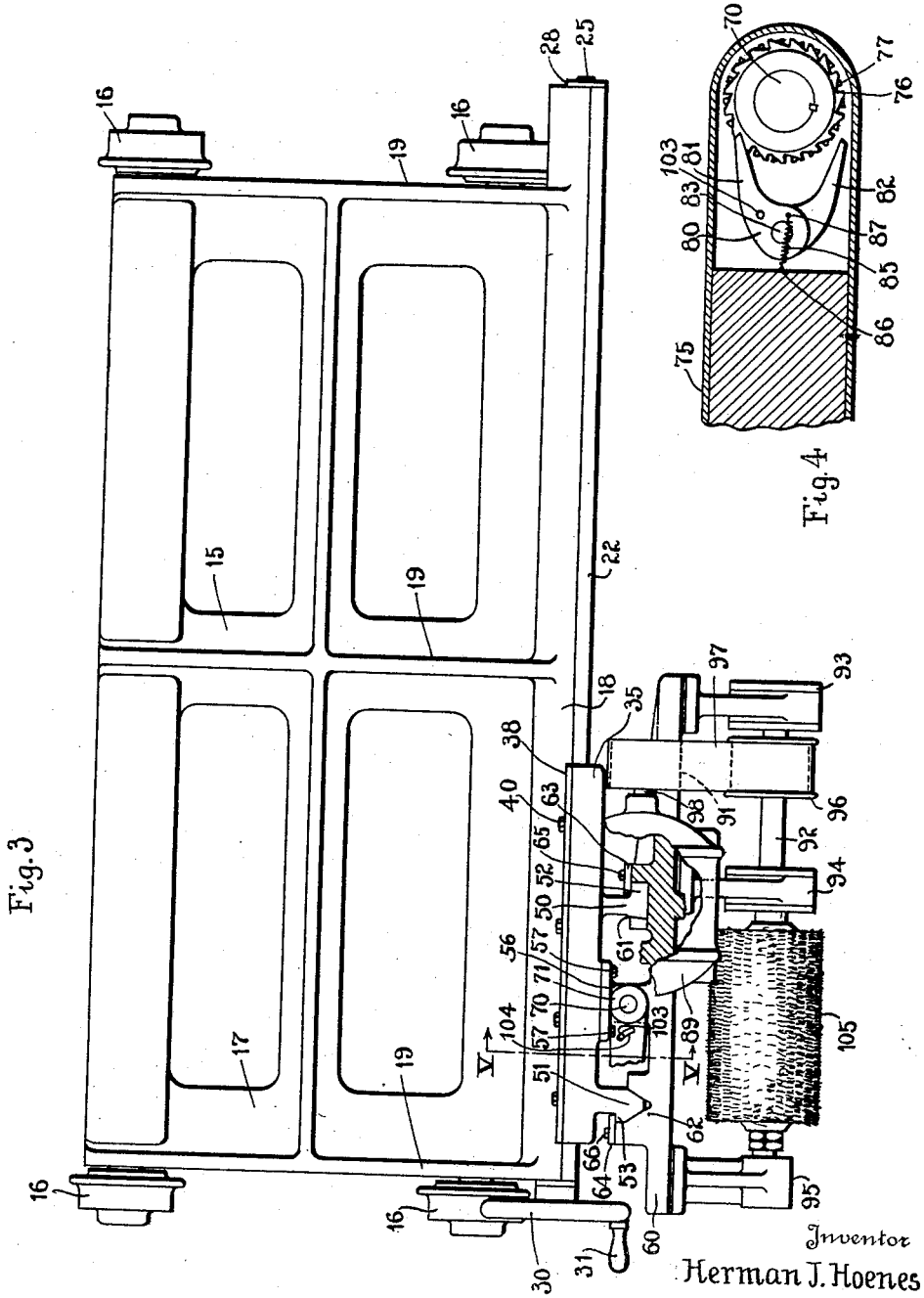
Fig. 3 is a plan view of the machine with certain parts broken away for the sake of clearness.
Fig. 4 is a fragmentary cross-sectional view, on a larger scale, showing in detail one of the elements employed in the machine.

The mechanism employed in conjuction with the handle 75 for turning the screw 70 is shown in detail in Fig. 4. According to this figure, the upper end of the screw is provided with contiguous ratchet wheels 76 and 77, one above the other, and having their teeth oppositely directed. A double pawl 80 is pivoted on a pin 83 secured adjacent the end of the handle 75, and has integral crank arms 81 and 82. The upper crank arm 81 is adapted to coact with the ratchet wheel 76, whereas the lower crank arm 82 is adapted to coact with the ratchet wheel 77. The position of the pivot 83, and the angularity between the arms 81 and 82 permits only one crank arm to engage a ratchet wheel at one time. A spring 85 normally maintains either of the arms in contact with its respective ratchet wheel, and has one end 86 secured to the arm 75, and its other end 87 secured to the pawl 80. It is apparent that when either crank arm is moved into coacting position with its corresponding ratchet wheel, the spring moves to a position on the opposite side of the pivot 83, thereby exerting its force to assist in the maintenance of the crank arm in contact with either ratchet wheel. It also is apparent that with this arrangement, the screw 70 can be turned in either direction by means of the arm 75 depending upon which crank arm is in engagement with the ratchet wheel. The arms of the pawl 80 are actuated manually to engage either of the ratchet wheels, according to the direction in which it is desired to rotate the screw 70, by a pin 103 secured thereto, which pin projects through and is movable in an opening 104 formed in the upper side of the arm 75.

A motor 89 is mounted upon the top of the frame 60 and is provided on its shaft 90 with a pulley 91. The lower front end of the frame 60 supports a shaft 92 rotatably mounted in spaced bearings 93, 94, and 95. A pulley 96 is secured to the shaft 92, between the bearings 93 and 94 and in the same plane as the pulley 91 on the shaft of the motor. The pulleys 91 and 96 are interconnected by means of a driving belt 97. An idling pulley 98 normally engaging the belt 97, is mounted adjustably upon the frame 60 by means of a slotted bar 99, and bolts 100 and 101. Since the idling pulley is mounted adjustably upon the frame 60, any slack in the belt may be taken up to maintain it at a desired tension. A brush 105 which preferably is composed of wire is mounted upon the shaft 92 and between the bearings 94 and 95. It is apparent that when the motor is operated, rotary movement is transmitted to the shaft 92 and brush 105 by means of the belt 97 and the pulleys 91 and 96. A steel molding plate 110 is adapted to be mounted upon the beams 111 and 112 on the frame 10, and is of such thickness, that normally it will maintain its position upon the beams during the cleaning operation.

In the operation of the apparatus the plate 110 is positioned upon the beams 111 and 112 and the brush adjusted vertically to an operative position by means of the screw 70 and the handle 75. The motor then is energized and the brush rotated in contact with the plate. Preferably a suitable cleaning material, such as Bon Ami, benzine, etc., is employed in conjunction with the brush. Since the frame 15 may be moved along the tracks 12 and 13 and the brush frame 60 moved laterally by means of the screw 30, it is apparent that the position of the shaft 92 and the brush may be so varied as to bring the latter into operative contact with the entire surface of the mold. All of the adjustments and movements of the frames are easily made, as very little friction of the parts is present. By adjusting the screw 70, the brush may be brought to bear with more or less force upon the mold 110.

From the foregoing description it is apparent that a machine has been provided which greatly facilitates the cleaning of molds, such as those employed in the manufacture of rubberized belting. The machine practically obviates the tedious manual labor heretofore required and saves a great amount of time and consequent expense. The adjustability of the parts of the machine insures efficient and expeditious cleaning of the molding plate surfaces.

Although I have illustrated only the preferred form which my invention may assume and have described that form in detail, it will be apparent to those skilled in the art that the invention is not so limited but that various modifications may be made therein without departing from the spirit of the invention or from the scope of the appended claims.

What I claim is:

1. A machine for cleaning molds, comprising a movable frame, a shaft in the frame adjustable laterally of the latter, screws for adjusting the shaft, a brush on the shaft, and means for rotating the shaft.

2. A machine for cleaning molds, comprising a movable frame, a shaft in the frame laterally and vertically adjustable with respect to the latter, screws for adjusting the shaft, a brush on the shaft, and means for rotating the brush.

3. A machine for cleaning molds, comprising a movable frame, a trackway for the frame, a shaft mounted in the frame intermediate the sides thereof, said shaft being laterally and vertically adjustable with respect to the latter, a brush on the shaft, adjusting means for moving brush and shaft downwardly relative to the frame whereby it may engage surfaces to be cleaned, and means for rotating the shaft.

4. A machine for cleaning molds, comprising a movable frame, a trackway for the frame, an auxiliary frame vertically adjustable relative to the wheeled frame, and rotatable cleaning means mounted upon the auxiliary frame.

5. A machine for cleaning molds, comprising a movable frame, a trackway for the frame, an auxiliary frame laterally movable relative to the wheeled frame, and rotatable cleaning means mounted upon the auxiliary frame.

6. A machine for cleaning molds, comprising a movable frame, a trackway for the frame, a second frame mounted upon the wheeled frame and adjustable laterally thereof, a third frame mounted upon the second frame and adjustable vertically thereof, and rotatable cleaning means on the said third frame.

7. A machine for cleaning molds, comprising a movable wheeled frame, a trackway for the frame, an auxiliary frame laterally and vertically adjustably mounted upon the wheeled frame, a motor on the latter frame, a shaft having a driving connection with the motor, and a cleaning element on the shaft.

8. A machine for cleaning molds, comprising a movable frame, a shaft in the frame adjustable laterally of the latter, means for adjusting the shaft, a brush on the shaft, and means for rotating the shaft.

9. A machine for cleaning molds, comprising a movable frame, a trackway for the frame, a shaft in the frame laterally and vertically adjustable with respect to the latter, means for adjusting the shaft, a brush on the shaft and means for rotating the shaft.

In witness whereof, I have hereunto signed my name.

Signed at Akron, in the county of Summit and State of Ohio, U. S. A., this 20th day of February, 1928.

HERMAN J. HOENES.